INVENTOR.
Achille Peloggio

INVENTOR.
Achille Peloggio
BY
Agent

United States Patent Office 3,487,797
Patented Jan. 6, 1970

3,487,797
DEVICE FOR BLIND FEEDING OF ARTICLES OF HOSIERY TO LINKING MACHINES
Achille Peloggio, Brignano d'Adda, Italy
Filed Oct. 18, 1967, Ser. No. 676,270
Claims priority, application Italy, Oct. 28, 1966, 29,403/66; Apr. 6, 1967, 14,649/67
Int. Cl. D05b 7/00, 27/00
U.S. Cl. 112—27          17 Claims

ABSTRACT OF THE DISCLOSURE

A device for blind feeding of articles of hosiery to the needle-holder rim of an linking machine, the device comprising a pair of spaced coplanar plate-like members defining a slit therebetween designed to receive the articles of hosiery and extending according to a direction substantially tagential to said needle-holder rim, the edge of one of said plate-like members defining said slit being made in the form of a guide in which a comb member is slidably arranged, co-operating holding means, pusher means, roller means and actuating cam means and transfer means being further provided for feeding and transferring said articles of hosiery to said comb member and from said comb member to the needles of said needle holder rim.

---

The present invention relates to the blind feeding of articles of hosiery, more particularly stockings, to the needle-holder rim of a linking machine for knitted fabrics.

It is known that the feeding of articles of hosiery, to the needle-holder rim of a linking machine, must theoretically be accomplished in manner such as to associate adjacent stitches of said articles to adjacent needles of said rim. However the laboriousness and difficulty of such theoretical operation and the necessity of providing skilled staff for said operation, have caused the technicians of this field to search for new and simplified solutions which will guarantee, together with a greater rapidity and practicality, a high daily production without detriment to the results of the linking. Amongst the different solutions which have been proposed the "blind" feeding is known which, whilst otherwise advantageous, has the shortcoming that skilled personnel must always be provided for loading the needle-holder rim with the articles of hosiery. In order to obviate this shortcoming apparatuses have been proposed constructed in manner such as to permit automation of said "blind" feeding. These known apparatuses are usually formed of guide and support members for the articles to be linked, said guide and support members being positioned tangentially to the needle-holder rim of the linking machine by pairs of peripherally toothed wheels which co-operate with one another and with said needle-holder rim for the feeding of said articles in said guides, said apparatuses also compirsing members designed to maintain said articles in tension until their complete application to the needles of said rim.

The automatic feeding apparatuses of known type are generally beset with far from negligible shortcomings amongst which the most notable is due to the fact that frequently the tensions given to the said articles are such as to cause the bending of the needles of said rim on which the feeding of said articles in the guide-support is mainly dependent, with the consequent rapid putting-out of use of the needles themselves. This inconvenience is more notable and more serious when the needles of the rim of the linking machine have, for working reasons, very small cross-sections.

A further shortcoming, also easily noticeable in feeding apparatuses of known type, is that the downward tension applied to the articles to be linked is not uniformly distributed along the line in which the linking of the articles themselves must occur, but is usually greatest at the ends of said line. For such reason it frequently occurs that the articles of hose assume a curvilinear position on the needles of the rim of the linking machine with a consequent incorrect linking line.

The main object of the present invention is that of providing a device for the blinding feeding of articles of hosiery, more particularly stockings, to the needle-holder rim of a linking machine which device is capable of obviating the above-mentioned shortcoming, that is to say a device which guarantees a rapid, practical and simple blind feeding of articles of hosiery, without any harmful tension being applied to the needles of said rim and without determining defective positioning of the articles on the said rim.

Another object of this invention is to provide said device with reduced dimensions so as to be easily associated to a linking machine. Another object is to avoid the use of complicated parts or parts of delicate working or difficult maintenance. A further object is to provide a device which is advantageous from the point of view of rationalization of labour of the personnel operating the linking machine equipped with said device.

These and still further objects, which will appear more fully hereinafter, are achieved by a device for blind feeding of articles of hosiery to the needle-holder rim of a linking machine characterized in that it comprises a support framework for mounting on the fixed structure of said linking machine, a pair of spaced plate-like members arranged in said support framework, a slit defined by said pair of plate like members and designed to receive said articles of hosiery, developing according to a direction essentially tangential to said needle-holder rim, a guide defined by the edge of one of said plate-like members and turned towards said slit, said guide being opened towards said slit and developing parallel to said slit and extending at least up to a zone of tangency with said needle-holder rim, a comb element slidingly supported in said guide, and means adapted to engage said comb element with said articles of hosiery situated in said slit.

Further characteristics and advantages of the invention will be better apparent from the following detailed description of preferred embodiments of a feeding device according to the invention, illustrated by way of non-limiting example in the accompanying drawings in which.

Figures 11, 12:
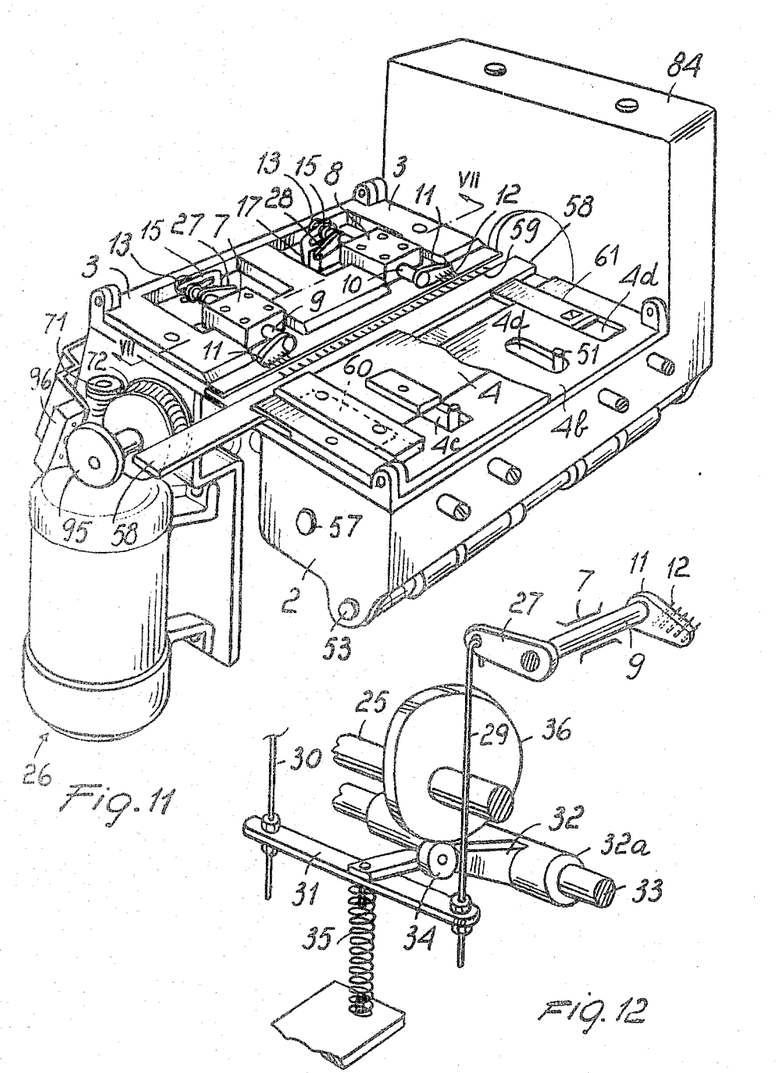
FIG. 11 shows in perspective the same feeding device according to the invention.
FIGS. 12 to 14 show constructional details of the feeding device according to the invention.

With reference to the device of FIGS. 1 to 18, the device for the "blind" feeding and assembly of articles of hosiery to the needle-holder rim of a linking machine, comprises a support frame, associated to the structure carrying the linking machine, formed of semi-frames 1 and 2. The upper plates 3 and 4 of said semi-frames are longitudinally associated with one another and define a slit 5 whose direction substantially coincides with the tangent to a linking machine (not shown). Said slit 5 forms the support member for the articles of hosiery, for instance stockings, which are manually positioned. The plates 3 and 4 are adjustable in height, while the slit 5 is of suitably adjustable width. The said plate 3 is provided, in its upper section, with sleeve members 7 and 8, respectively, inside which shafts 9 and 10 are engaged in manner such as to be free to revolve, said shafts sliding in said sleeve members in a perpendicular direction with respect to said slit 5. Transversely to each of said shafts 9 and 10, and at the ends thereof near said slit, a comb-shaped member 11 is rigidly and cantilever-wise associated, said comb-shaped members extending outwardly of the area contained between the said shafts and having teeth 12 turned towards said slit 5. The ends of the shafts 9 and 10, opposite to those provided with said comb members 11, are shaped according to ends 13, defining annular grooves 14 in which the forked upper ends 15 of levers 16 and 17 are engaged. Said levers 16 and 17 are of substantially vertical development and their other ends 18 and 19 (FIG. 7) which are in the form of sleeves, are revolvingly associated, through an aperture 3a of said plate 3, to a shaft 20. Said shaft 20 is supported in its lower portion by the semi-frame 1 and develops parallelly to said slit 5. Said levers 16 and 17 are provided, in an intermediate position, with revolving contact rollers 21 and 22 which, by the action of respective springs, are constantly maintained in contact with the profiles of the cams 23 and 24, respectively. Said cams 23 and 24 are rigidly mounted on a camshaft 25, which derives its rotational movement from a motor unit 26 in a manner which will be described hereinafter. The said shafts 9 and 10 are provided in an intermediate position between the ends 13 and the sleeve members 7 and 8, with eyelet members 27 and 28 extending inwardly of the area contained between said shafts 9 and 10. In said eyelet members 27 and 28 are respectively engaged the hooked upper ends of rod-like members 29 and 30, substantially of vertical development. The lower ends of said rod-like members 29 and 30 are rigid with a plate 31, rigidly and transversely associated to the end of a lever 32 whose other sleeve-shaped end 32a is revolvingly mounted on a shaft 33, supported by said semi-frame 1 parallel to said slit 5. Said lever 32 is provided in an intermediate position with a revolving contact roller 34, constantly maintained, by the action of a spring 35, in contact with the the profile of a cam 36, rigidly mounted on said cam shaft 25 (FIG. 12).

In a position below the plate 3, the semi-frame 1 supports, through guide members 1a and 1b, a carriage 37 of length substantially equal to the length of the slit 5, with respect to which said carriage has an approaching and spacing motion. Said carriage 37 supports, on the side facing said slit 5, a revolving roller 38, while on its opposite side it is provided with depending portions or fingers 38a which are in engagement with the upper ends of levers 39 and 40 of substantially vertical development. The lower sleeved ends of said levers 39 and 40 are revolvingly associated to said shaft 20. Said levers 39 and 40 are provided in intermediate positions thereof with revolving contact rollers 43 and 44 respectively, constantly maintained in contact, through springs 39a and 40a which act on said fingers 38a, with the profiles of the cams 45 and 46 rigidly mounted on said camshaft 25.

The plate 4 of the semi-frame 2 is formed of two plate-like members 4a and 4b mutually associated, by screw means, in superimposition and defining, parallel to said slit 5, a notch 47 longitudinally open towards said slit. Above said plate-like member 4a members 48 are positioned, forming guiding shoulders for a plate-like counter member 49, freely sliding with respect to said plate-like member 4a and in a direction perpendicular to said slit 5. Said plate-like member 49 is provided with projecting portions 50 with holes 50a, engaging with the upper ends 51 of levers 52, of substantially vertical development, through the apertures 4c of the plates 4a. The lower ends of said levers 52 are revolvingly associated with a shaft 53, supported by the semi-frame 2 parallel to said slit 5. The said levers are further provided, in an intermediate position thereof, with contact rollers 54, constantly maintained in contact, by the action of springs 52a, with the profiles of cams 55 and 56 rigidly mounted on a camshaft 57 which is also supported parallel to said slit 5 by the semi-frame 2. The camshaft 57 derives a rotational movement from the motor unit 26 as will be described hereinafter. The said notch 47 forms a longitudinal seat in which is positioned a rod-like comb member 58, provided with a pair of rows of teeth 59, facing said slit 5 and subjected to the action of rod-like members 60 slidingly positioned perpendicular to said slit 5. Said rod-like members 60 which slide in guides formed by notches 61 (FIG. 11) machined in the plate-like member 4b are associated, at their ends opposite to those facing said comb 58, with the upper ends 62 of substantially vertical levers 63 and 64 which pass through the apertures 4d produced in the plate 4b. The lower sleeved ends 63a and 64a of said levers 63 and 64 are revolvingly associated with said shaft 53.

Figure 6:
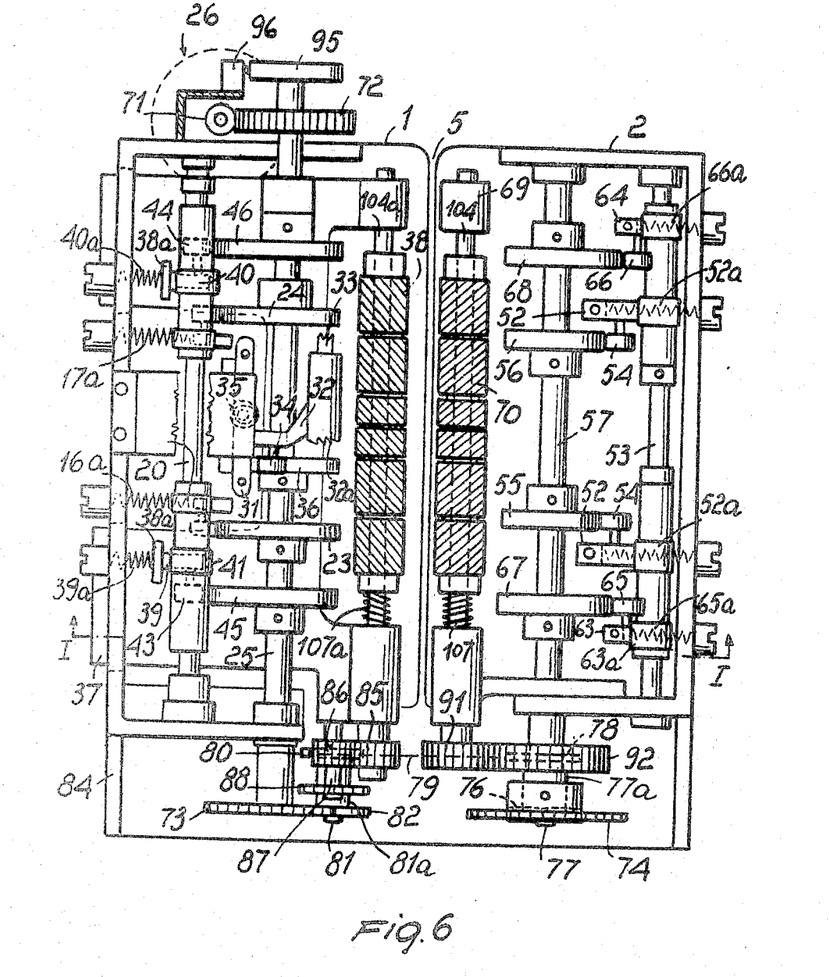
FIG. 6 shows the same device seen from below.
Figure 7:
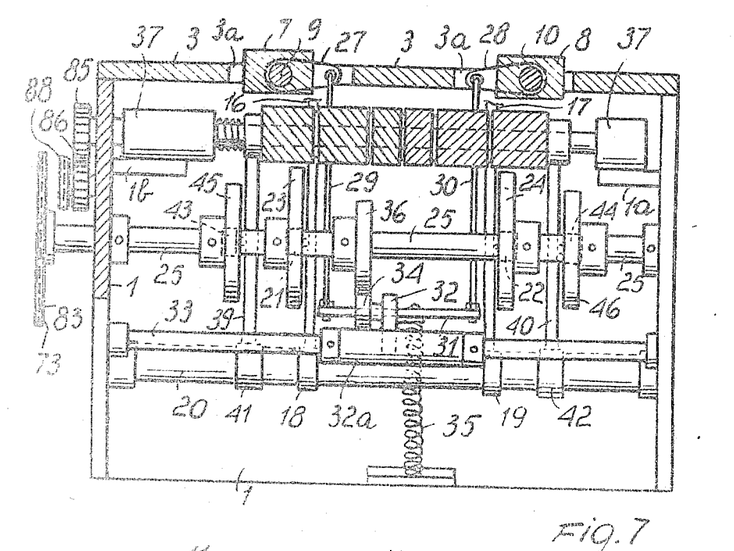
FIG. 7 shows the same device in section along the line VII—VII of FIG. 11.
Figures 8, 9, 10:
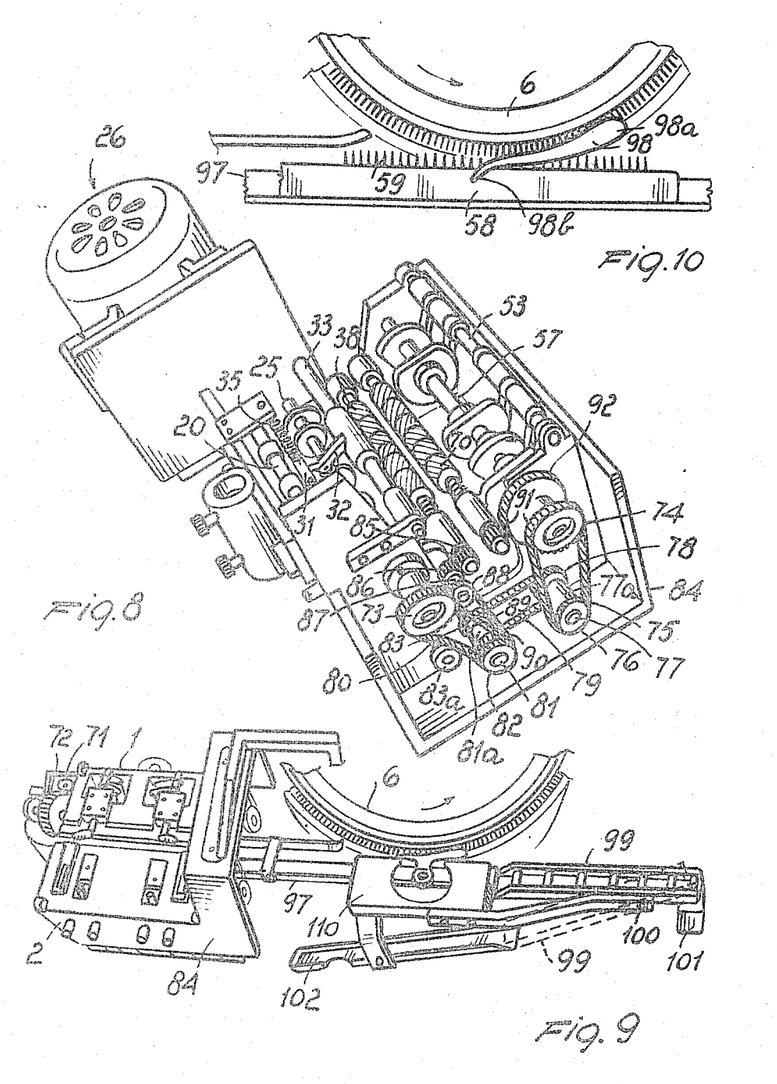
FIG. 8 shows the same device in perspective, seen from below, with the system for the transmission of motion to the rotating members of said device.
FIGS. 9 and 10 show in perspective and to an enlarged scale a detail of the device according to the invention.

Said levers 63 and 64 are moreover provided, in intermediate positions thereof, with contact rollers 65 and 66, constantly maintained in contact, by means of springs 65a and 66a, with the profiles of respective cams 67 and 68, keyed on said camshaft 57 (FIG. 6).

To the lower section of said plate-like member 4b brackets 69 are secured by means of screws 69a, said brackets being arranged at the ends of said slit 5 in which brackets a roller 70 revolving engages. To said roller 70 is arranged parallel to said roller 38 with which it is designed to co-operate, as will be described in more detail hereinafter.

The rotary movement of the camshafts 25 and 57, suppoted by the semi-frames 1 and 2 respectively, and of the rollers 38 and 70 is derived from a motor unit 26 in the following manner: the motor unit 26 is externally secured to said semi-frame 1 and has a drive-shaft with vertically arranged endless screws 71. Said endless screws 71 engage with a cog wheel 72 rigidly mounted on the said camshaft 25, in the portion of the latter projecting from said semi-frame 1. To the other end of said camshaft 25, which also extends outside the semi-frame 1, a cog wheel 73 is rigidly mounted, while at the neighbouring end of the camshaft 57, projecting from the semi-frame 2, a cog wheel 74 is rigidly mounted. Said cog wheel 74 is transmissively linked with said cog wheel 73 through a chain 75, a cog wheel 76 rigidly mounted on a bush 77a, idly mounted on a pin 77, a cog wheel 78 also rigidly mounted on said bush 77a, a chain 79, a cog wheel 80 rigidly mounted on a bush 81a idly mounted on a pin 81, a cog wheel 82 also rigidly mounted on said bush 81a and the chain 83 with chain stretchers 83a. The above enumerated transmission system is positioned in a vertical essentially bridge-like conformation, in such a manner as not to interfere with the said slit 5 or with a prolongation of the same, and is contained in a vertical framework 84 secured by per se known means to the semi-frames 1 and 2. Said framework 84 thus rigidly maintains said semi-frames 1 and 2 in the desired spaced position determining the slit 5. Again with reference to said FIGS. 6 and 8 the roller 38 mounted on a shaft 104a for its rotational movement, has an end of said shaft 104, projecting in said framework 84, provided with a cog wheel 84; said cog wheel 85 is in engagement with a gear 86 mounted idle on a pin 87. On said pin 87 is mounted a cog wheel 88 rigid with said gear 86 and idle with respect to said pin 87. Said cog wheel 88 engages with a chain 89 associated with a wheel 90 rigidly mounted on the said bush 81a of the above described transmission system. The roller 70 mounted on a shaft 104, for its rotational movement, has a gear 91 in engagement with a gear 92, rigid with an end of the said camshaft 57.

The operation of the device according to the invention for the blind feeding or assembling of articles of hosiery, particularly stockings, onto a linking machine is as follows:

The articles of hosiery indicated in the drawings by dashed lines 93, provided in known manner with thickened portions 94 at the edges to be united by linking, are manually slipped inside said slit 5 in such a manner that said thickened portions 94 lay on the upper edges of the slit 5 itself and support the piece of hosiery in a vertical position. Simultaneously in the said notch 47 the comb 58 with two rows of teeth 59 is arranged, said teeth facing the articles to be linked. At the commencement of the operative cycle, in order to allow the slipping of the article of hosiery in the slit 5, the cams of the camshafts 25 and 57 are orienated in such a manner that the movable roller carrying carriage 37 is in a spaced position with respect to the roller 70, the shafts 9 and 10, the plate-like sensing member 49 and the rod-like members 60 and 61, which act on said comb 58, are in the most distant positions in comparison with the slit 5 in opposition to the respective springs (see FIG. 1).

Figure 17:
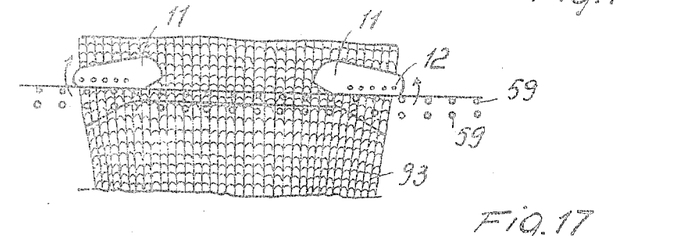
Figure 18:
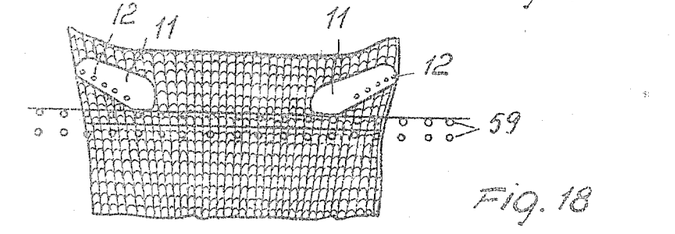

The operative cycle starts, with suitable pushbutton or pedal actuation (not shown), the motor unit 26 which by means of the endless screw 71 and the gear 72, causes the camshafts 25 and 57 to turn with equal and opposite rotation. In the first operative phase the movable carriage 37 which carries the rotating roller 38 advances until the roller 38 is practically in contact with the roller 70; said rollers contain the articles to be linked together and place said articles in tension thanks to the rotatory movements imparted to said rollers. Said advance occurs under the control of the levers 39 and 40, of the cams 45 and 46, as well as the springs 39a and 40a (see FIG. 2). The second operative phase consists in the simultaneous advance of the shafts 9 and 10, under the control of the levers 16 and 17, and the cams 23 and 24 as well as the plate-like checking member 49, under the control of the levers 52, the cams 55 and 56 and the springs 52a. This second phase corresponds to the insertion of the combs 11 in the articles for linking; such insertion occurs in the end sections of said articles with respect to the longitudinal extension of the line along which the linking will occur (see FIG. 2). The third phase of the operative cycle provides the return of the plate-like checking member 49 and the temporary return of the roller-carrying carriage 37. With slight delay with respect to said return the cam 36 determines, against the action of the spring 35, the lowering of the lever 32 and the plate-like member 31. Correspondingly the lowering of the rod-like members 29 and 30, with relative rotation of the shafts 9 and 10 in mutually opposite direction is obtained. To said rotation corresponds an upward rotation of the lateral combs 11, about the axes of said shafts, with relative raising of the ends of the articles of hosiery engaged in said lateral combs. At this point the third phase of the operative cycle begins; while the lateral combs 11 remain stationary in their upward rotated position, a new advancement of the roller-carrying carriage 37 occurs (still controlled by the levers 39 and 40 and the cams 45 and 46) until the roller 38 exercises, in co-operation with the roller 70, a tension of pre-determined value on the articles for linking. The reason for, and importance of, these lateral combs 11 may be understood from the following considerations (FIGS. 17 and 18). The rollers 38 and 70 determine, as has been seen, a downward traction on the articles of hosiery being slipped into the slit 5. This traction, at the ends of the articles of hosiery, with respect to the line in which the linking will occur, determines a deformation of the stitches greater than in the sections between the said articles, because the end stitches are not helped by the adjacent stitches to resist the traction. From this deformation would follow a curving of the line according to which the linking will occur, to the detriment of the product. In order to obviate this shortcoming, the combs 11 provided at the said ends of the articles to be linked, raise the ends themselves by an amount sufficient to compensate for the deformations introduced by the greater stress to which the end stitches are subjected (see FIG. 3).

Figure 1:
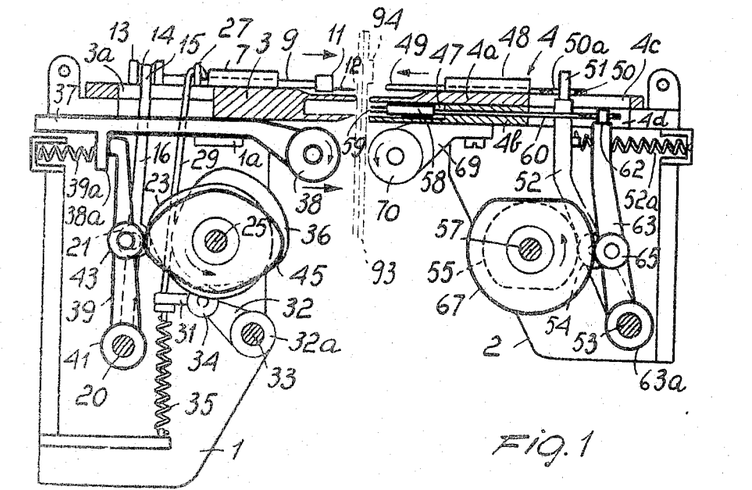
FIGS. 1 to 5 show the device according to the invention in section along the line I—I of FIG. 6 and in elevation, in the successive phases of the operative feeding cycle of articles of hosiery.
Figure 2:
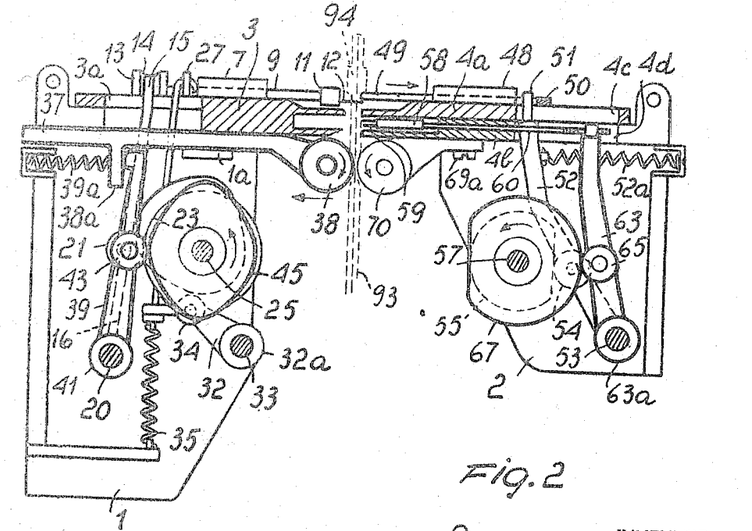
Figure 3:
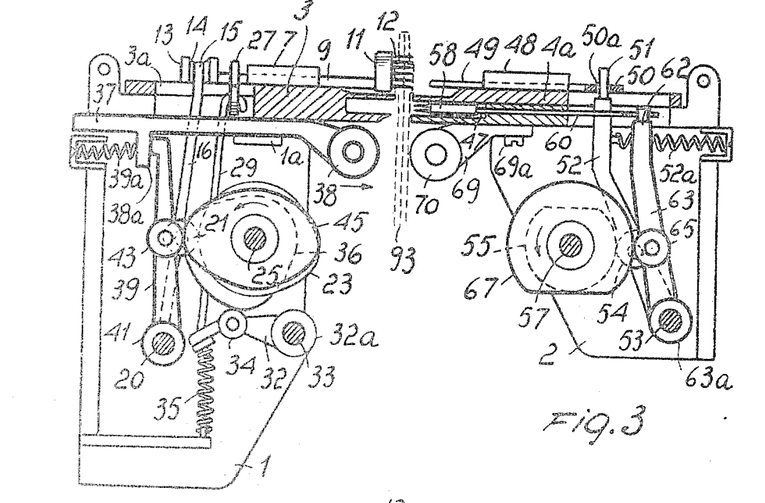
Figure 4:
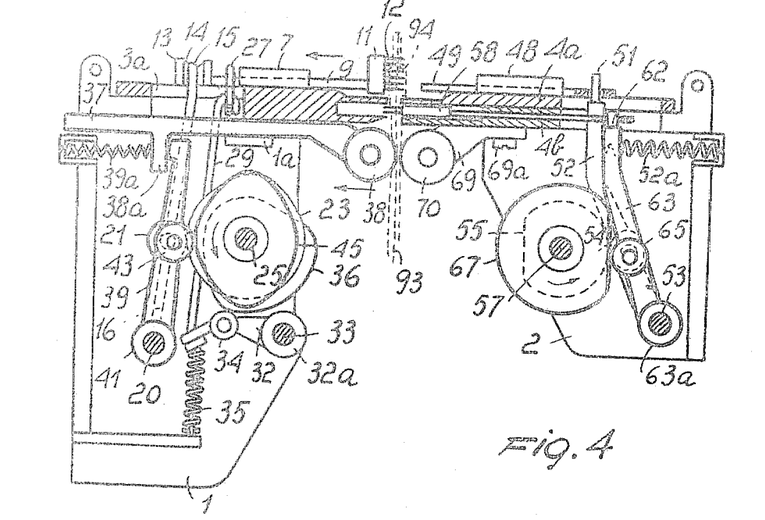

In the moment in which the roller 38 has reached the said work position, the rod-like members 60 and 61, under the control of the levers 63 and 64, the cams 67 and 68 and the springs 65a and 66a, determine the advance of the comb 58 until the double row of teeth 59 of the latter is completely inserted for all its length into the articles to be treated (see FIG. 4).

Figure 5:
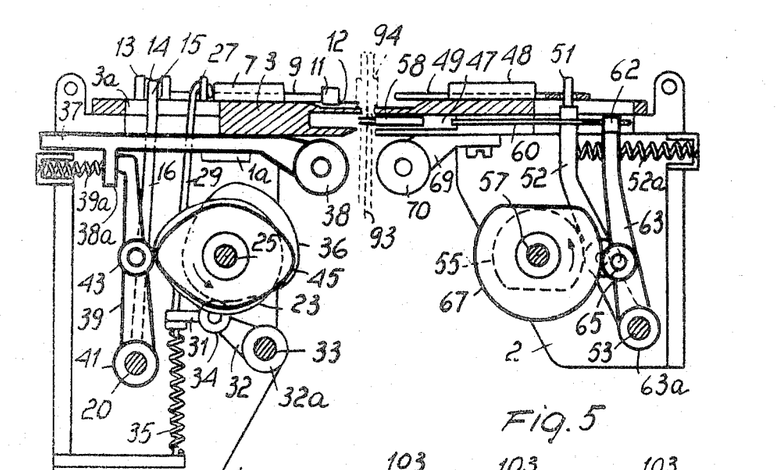

The fourth phase of the operative cycle consists of a return to the initial position of all the constituent members of the above described device, with the exception of the comb 58 which is now loaded with articles for feeding to the needle-holder rim of the linking machine (see FIG. 5). At the end of this phase a cam 95, rigidly mounted on the camshaft 25, in proximity of the motor unit 26, acts on a microswitch 96 which stops the motor group of the operative cycle. The transmission relationship between the screw 71 and the gear 72 is selected in such a manner that the above-described phases of the operative cycle occur during a single turn of the camshafts 25 and 57.

In the seat 47 a new comb 58 is inserted, thus determining the pushing out, from the side of the device facing the linking machine, of the comb previously loaded in the feeding device. The comb 58, loaded with the article for linking in exit from said device, is pushed along a guide 97, formed by an essentially L-shaped profile, which extends to an area of tangency with the needle-holder rim 6 of the linking machine. In this area of tangency a device is arranged for the transfer of the previously loaded article of hosiery from the comb 58 to the needle-holder rim 6. The said transfer device comprises a double curvilinear bladed member 98, the distance between the blades thereof being sufficient for the passage of the comb 58. The ends 98b of said blades upstream with respect to the movement of the comb, lay on said comb 58 passing beyond the base of the teeth 59 of the latter, while the other ends 98a of said blades are in proximity to the base of needles of the rim 6. Said blades 98, which in practice act as deviators, are supported by a plate 110 secured to the supporting frame of the linking machine in a position below the L-shaped guide 97 and the path to the needle-holder rim 6, with per se known means. The said blades 98 determine the separation of the articles of hosiery from the teeth of the said comb 98, which are simultaneously transferred onto the needles of the rim 6 which determine the entrainment of the article of hosiery and the comb itself. This entrainment effected by the needles of the rim 6 is not harmful to the needles themselves, in the sense of causing bending or the like, because the comb is free to slide and the hosiery arranged on it is already in a position such as to be able to be transferred to the said needle-holder rim. All this occurs whilst the comb continues to slide along its rectilinear guide, being spaced from the area of tangency to the needle-holder rim. When the comb, discharged of the article of hosiery in the said manner, is completely positioned at the outside of the area of tangency inserted by the said curvilinear bladed member 98, it is placed on a guide 99 tiltable with respect to a pivoting point 100. The tilting of the said guide 99, which is provided with a counterweight 101, carries the comb 58 to an arrival station 102 from whence it may easily be removed, by the personnel assigned to the loading of the feeding device, in order to commence a new cycle.

Figures 13, 14:
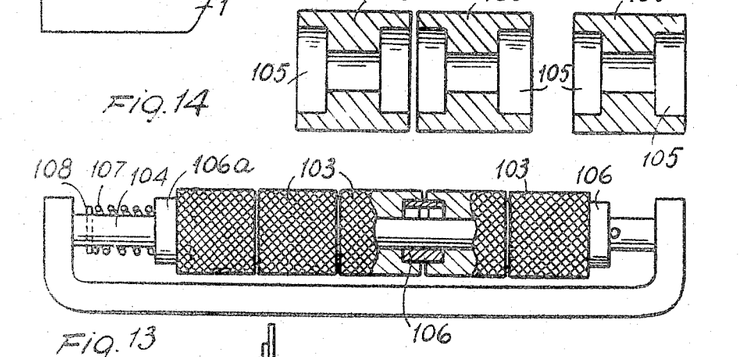

The rollers 38 and 70, which co-operate in putting the articles of hosiery in a state of tension both before and during their engagement with the teeth 59 of the comb 58, are advantageously of the form indicated in FIGS. 13 and 14. Said rollers comprise a plurality of sleeves 103 with knurled surfaces, having transverse end faces, centrally provided with cylindrical hollows 105 coaxial to said sleeves 103; when said sleeves 103 are mounted on said shaft 104 in a mutually aaproached position the said hollows 105 define cylindrical housings. In said housings defined by the hollows 105 are arranged bushes 106 rigidly mounted on said shafts 104 and 104a. The lateral surfaces of said bushes 106 are in contact with the internal lateral surfraces of the cylindrical housings defined by the said sleeves 103. On said shafts 104 and 104a a spring 107 is positioned. Said spring laying against a pin 108 inserted diametrically through said shafts 104 and 104a, acts against the first of said bushes 106 (indicated in FIG. 13 by reference numeral 106a). The action of the spring 107 and the friction between the bushes 106 and the lateral internal surfaces of the housings defined by said sleeves 103, is such that the group of said sleeves 103 forms a single rotatory unit.

Figure 15:
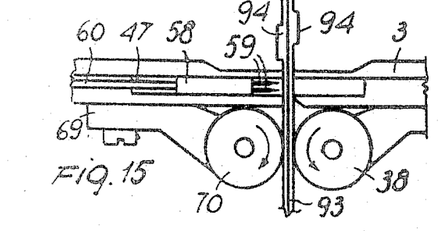
FIGS. 15 to 18 show details of the feeding device according to the invention in successive working phases.
Figure 16:
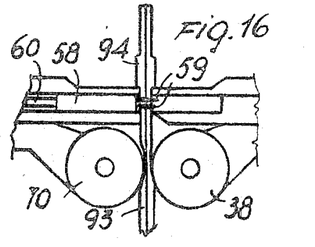

During the action of tension on the articles of hosiery to be fed to the needle-holder rim of a linking machine, said rollers 38 and 70, due to the special above described structure, are able to exercise a tension uniformly distributed along the entire length of said articles. Furthermore when said tension reaches, in a region of said articles, values above a predetermined level (which limit is selected in relation, for example, to the breaking stress of the threads of which the articles are made) by suitably loading the spring 107 the "release" between the sleeves 103 and the rotating bushes 106 is determined with the simultaneous stopping of rotation of the sleeves 103 arranged in the area in which an excess of tension exists. A further advantage achieved by the special structure of the rollers 38 and 70 consists in the fact that, with reference to FIGS. 15 and 16 showing said rollers in rear view, the articles of hosiery may be positioned in the slit 5 without the need for tallying the thickened portions 94 since the differentiated action of the rollers (as described previously) is such as to effect the desired positioning shown in FIG. 16, In FIGS. 19 to 29 the feeding device is shown according to a variation wherein means for the automatic displacement of the comb member are provided, as well as other improvements.

With reference to said FIGS. 19–29, the device for the blind feeding and assembly of articles of hosiery to the needle holder rim (201) of a linking machine, comprises a conveyor belt arrangement 202. Said conveyor belt 202 is adapted to receive the comb 203, which has already transferred an article of hosiery onto the needles of the said rim 201, and carry it to a loading member 204. During the transfer phase of the articles for linking each comb 203 is pushed inside a corresponding guide grooving 205 positioned near the slit 206 in which the said articles are gradually inserted.

The initial displacement of each comb 203 is caused by a rod-like member 207 mounted movable in a to-and-fro manner by means of a pusher mechanism 208; while the combs 203 are set in motion in said grooving, aligned with said rod-like member 207, by means of the said loading member 204.

More precisely the return system for the said combs 203 comprises a first conveyor belt 209 performing a transverse movement substantially orthogonal to said slit 206, a second conveyor belt 210 flanking said conveyor 209 in orthogonal direction to the latter and followed in alignment by a third conveyor belt 211 comprising a slightly inclined section 211a and a horizontal section 211b positioned in the operative range of the said loader member 204.

Figures 19, 25:
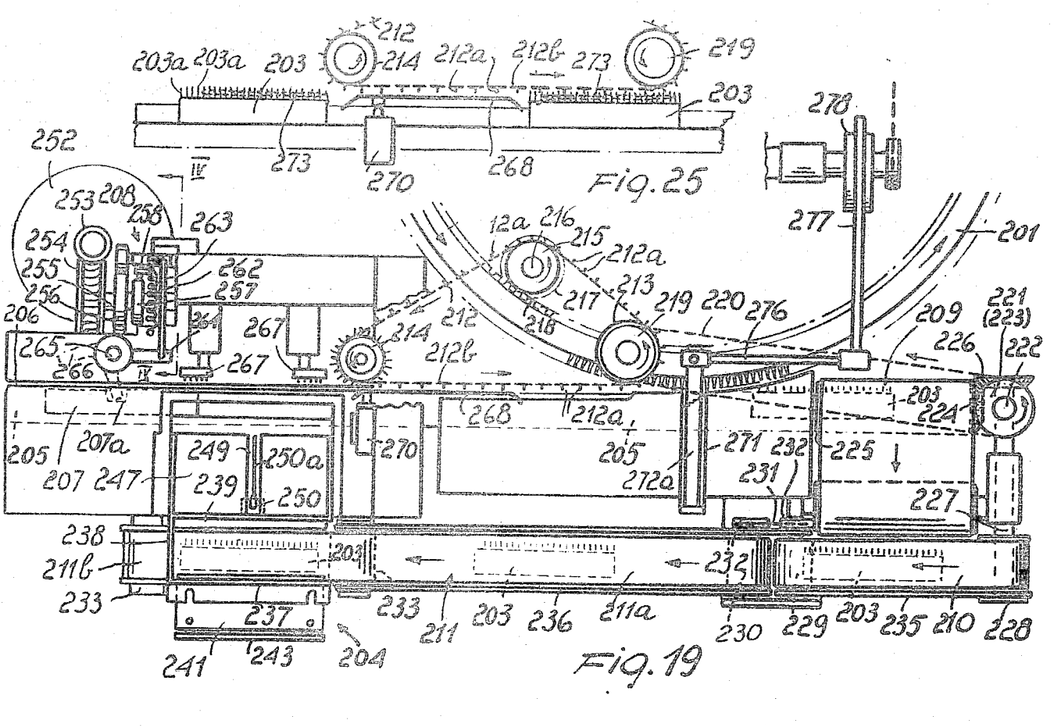
FIG. 19 is a diagrammatic plan view of the feeding device according to a variation comprising means for the automatic displacement of the comb members.
FIG. 25 is a plan view of a part of the device of FIGS. 19 to 24 during an operating stage.

The motion of said conveyor belts is derived from the said needle-holder rim 201 which also places a chain 212 in motion. Said chain 212 is provided with a plurality of spikes (212a) secured to the respective links in such a manner as to project outwardly. A section 212b of the chain 212 is arranged above said slit 206 in such a manner that the spikes 212a correspond with a section of said slit in proximity with the said needle-holder rim 201. The chain 212 is wound on three gears 213, 214 and 215 of which the latter is rigidly mounted on a vertical shaft 216. On said shaft 216 a further gear 217 is also mounted, said gear being in mesh with a toothing 218 internally provided in said needle-holder rim 201 (FIG. 19).

Figures 20, 22, 24:
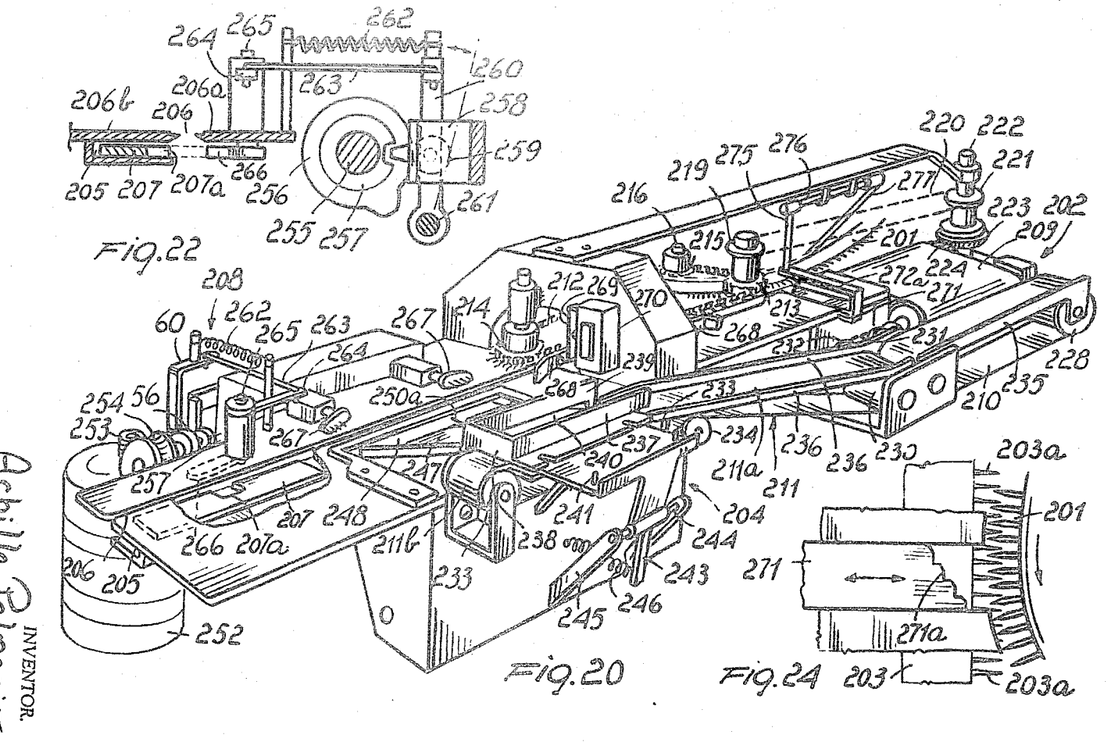
FIG. 20 is a perspective view of the device of FIG. 19.
FIG. 22 is a cross-section executed according to the line IV—IV of FIG. 19.
FIG. 24 is a plan view of a part of the detail of the preceding figure.
Figure 21:
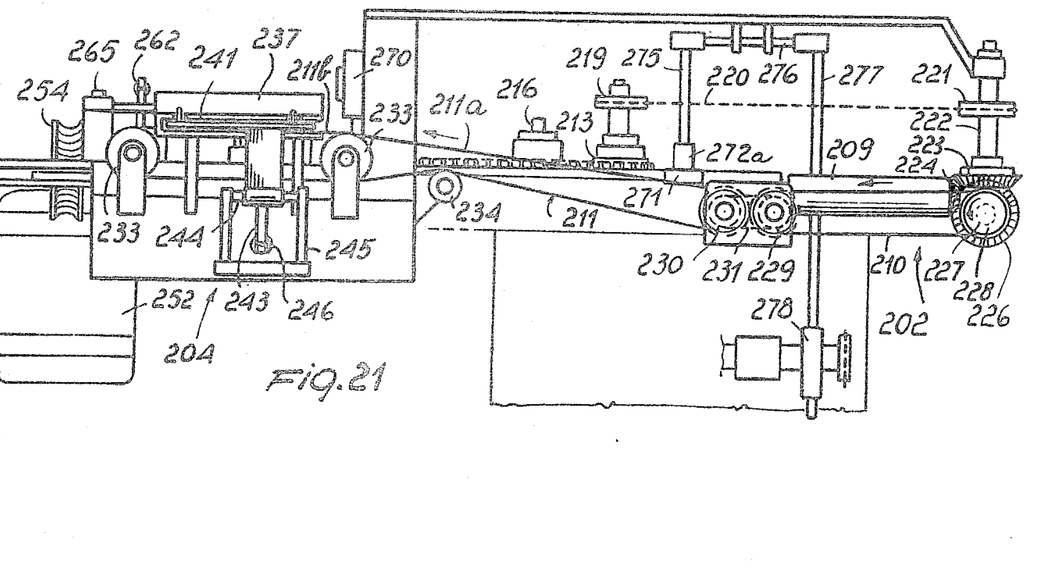
FIG. 21 is a side view of the device of FIGS. 19 and 20.

The gear 213 is arranged rigid with another gear 219 which engages with a chain 220 which transmits the movement to a further gear 221 keyed on a vetical spindle 222. A bevel gear 223 is rigidly mounted on the lower section of said spindle 222 and is in mesh with a first bevel gear 224 rigid with a driving roller 225 relative to the said conveyor belt 209 and in mesh with a second bevel gear 226. Said conical gear 226 is rigid, by means of a horizontal spindle 227, with a driving roller 228 of the conveyor belt 210. A driven roller 229 of said latter conveyor belt transmits the movement to a driving roller 230 of the conveyor belt 211 by means of a chain connection 231 and relating gears 232 (FIGS. 19, 20 and 21).

The conveyor belt 211, besides being wound about the roller 230, is wound also about two rollers 233, mounted so as to be free to rotate near the said loader 204, and about an idle roller 234 arranged in manner such as to stretch the belt 211 itself.

With the above described arrangement, the combs 203 gradually discharged by the feeding device pass, in sequence, on the conveyor belts 209, 210 and 211, being displaced in the direction indicated by the arrow, until arriving at the loading member 204. The combs are retained on the said conveyor belts by respective guides 235, 236 and 237.

At the guide 237 a picker or receiver is arranged, said picker being composed of the guide 237 itself, of a tie 238 secured immediately above said conveyor 211 so as to gradually halt the said combs 203, and of a plate 239 secured parallelly to said guide 237 and provided with a slit 240 through which the combs 203 may pass one at a time.

Figures 27, 28, 29:
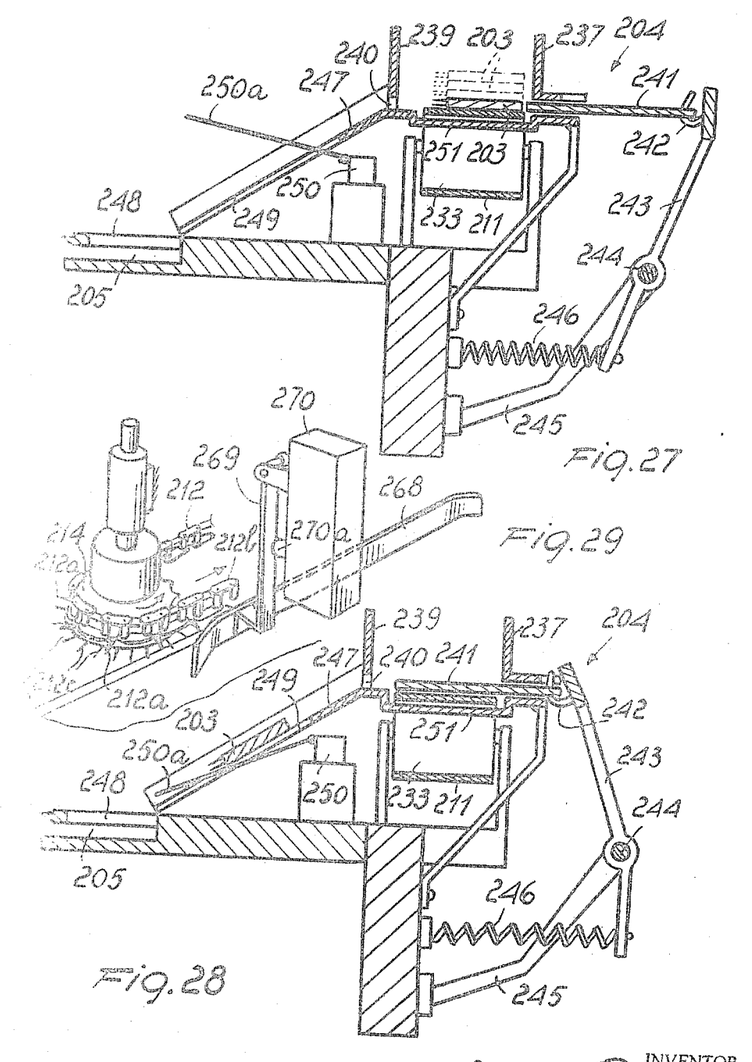
FIGS. 27 and 28 show, in cross-section and to an enlarged scale, the loader member of the device of FIGS. 19 to 26 in rest and loading positions respectively.
FIG. 29 shows a detail of the entrainment means of the device of FIGS. 19 to 28.

As is clearly shown in FIGS. 27 and 28, each comb may be manually pushed through said slit 240 by means of an extended pusher member 241 slidingly associated, in a horizontal direction, inside a respective passage and articulated, in 242, to the end of an oscillating lever 243 pivoted, in 244, to a fixed support 245 and connected at its other end to a return spring 246. After passing through the slit 240 the comb falls onto a chute 247 which carries it under gravity towards a loading aperture 248 produced at the said guide grooving 205 and of dimensions sufficient to allow the passage of said combs.

The said chute 247 is then provided with a slot 249, through which the contact bar 250a of a microswitch 250 may pass, said contact bar normally remaining raised (FIG. 27) and being lowered, by direct contact, during the passage of the combs 203 (FIG. 28).

Because of the inclination of the section (211a) of the belt 211, the combs 203 transported by it, when not suitably utilized, are superimposed one upon the other (FIG. 27) in the section 211b relative to the picker or receiver formed by the plates 237, 238 and 239, said combs stopping against the plate 238.

In order to prevent the conveyor belt 211, in the section 211b, from bending under the weight of the combs 203 a fixed plate 251 is arranged between said rollers 233, said plate 251 passing below the upper portion of the belt contained between the rollers 233 (FIGS. 27 and 28).

The to-and-fro movement of the rod-like member 207 inserted in the grooving 205, is derived from an electric motor 252 which also actuates the device for the transfer of the articles, to be linked on the combs 203, according to what was previously described in relation to FIGS. 1 to 18. More precisely an endless screw 253, rigidly mounted on the shaft of said motor 252 engages with a respective cog wheel 254 rigidly mounted on a spindle 255 on which two cams 256 and 257 are secured. Said cam 256 controls the said pusher device 208 while the cam 257 acts on a switch 258 connected to the switch 250 in the manner shown in FIG. 26. In this way the spindle 255 completes a single turn, after which it stops and remains at rest until the subsequent actuation thereof, as will appear more clearly hereinafter.

The said cam 256 engages with a roller 259 revolvingly and idly mounted on a lever 260 pivoted, at an end, on a fixed pin 261 and associated, at its other end, with a spring 262 capable of maintaining the said roller 259 in engagement with the cam 256 (FIG. 22). The upper portion of said lever 260 is moreover articulated to an end of a rod 263 whose other end is articulated to a projection 264 rigid with a revolving pin 265. This latter is arranged with its shaft substantially vertical and projects below the said plate-like member 206a which, together with the plate-like member 206b, defines the slit 206. Said pin 265 supports, at its lower end, a lever 266 capable of engaging with a respective grooving 207a of the said rod-like member 207. When the projection of the cam 256 engages with the roller 259 the lever 260 is caused to oscillate, thus determinng oscillation of the pin 265 about its own shaft, due to the connection of the rod 263. This causes an oscillation of the lever 266 which causes a stroke of the rod-like member 207 in the guide grooving 205. Thus the combs 203 coming from the loader member 204 are advanced by means of the pushing action, in an axial direction, of said rod-like member 207. In FIGS. 19 and 20 the previously described lateral combs 267, which serve to raise the ends of the articles for linking, are shown.

Near the section 212b of the chain 212 is arranged, in flanking position, a plate-like member 268 having folded edges and supported by a lever 269 fulcrumed in its upper section to the body of a microswitch 270 whose push-button 270a is arranged in such a manner as to be actuated by said lever 269. The arrangement of the plate 268 is such that it will be laterally displaced at the passage of an article for linking, carried by the chain 212, determining the tripping of the switch 270 by the engagement of the relative push-button 270a with the lever 269.

As shown in FIG. 29, below the gear 214 engaged with the chain 212, a wheel is provided with teeth 212c whose pitch is less than that of the teeth 212a, in order to facilitate the transport of the knitted fabrics to be linked and already mounted on the combs 203.

Figure 23:
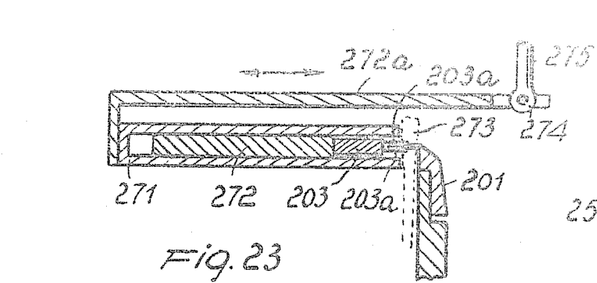
FIG. 23 is a cross-section relative to a detail of the device of FIGS. 19 to 22.
Figure 26:
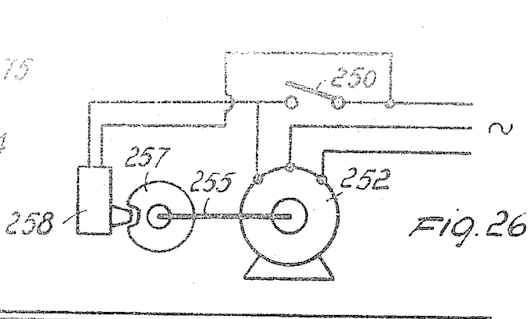
FIG. 26 is an electrical diagram relative to the starting of the device of FIGS. 19 to 25.

In order to facilitate the removal of the articles for linking, from the combs 203 to the needles of the rim 201, a transverse fork 271 is provided, mounted for to-and-fro movement on a guide plate-like member 272 and terminating with saw-toothed edges 271a (FIG. 24) inclined with respect to the longitudinal direction of the fork itself. Said fork is arranged in such a manner that the edges 271a pass above and below the combs 203 passing in proximity of the needle holder rim 201, so as to exercise a trusting action, in a transverse sense, on the edges of the articles for linking 273 (FIG. 23). The articles 273 are thus easily transferred from the teeth 203a of the combs 203 (provided with a pair of rows of teeth) to the needles of the rim 201, while the said combs advance towards the belt 209.

The fork 271 is provided with an extremely rapid oscillatory motion by means of a linkage 272a, articulated in 274, to a lever 275 which, in turn, is rigid with a spindle 276 oscillated about its own shaft, by means of a lever 277. Said lever 277 engages with a cam 278 transmissively connected to the driving means of the linking machine.

The operation of the embodiment shown in FIGS. 19 to 29 is as follows:

The articles of hosiery 273, provided in known manner with fabric checkers near the edges to be seamed by the linking machine, are manually inserted into the slit 206 in such a manner that said checkers lay on the upper edges of the slit itself. The said articles of hosiery are displaced to the portion of the slit 206 intersected by the loader member 204 and the lateral combs 267, the passage being possible since the lever 266 relative to the pusher member 208 is positioned, in rest conditions, in the position indicated by dotted lines in FIG. 20, laterally to said slit 206.

At this point the operator assigned to the linking machine acts manually on the extended pusher member 241, pushing it towards the chute 247, in such a manner as to cause it to reach, through the slot 240, a comb 203. When the operator releases hold of the member 241 it returns, under the action of the return spring 246, to its initial position, while the comb 203 passes on the chute 247 causing the lowering of the contact bar 250a of the switch 250 which causes the starting of the electric motor 252. As is clearly shown in FIG. 26 the rotation thus occurs of the cam 257 which depresses the push-button of the switch 258 keeping it depressed for a complete turn of the cam itself. In such manner the feed of the electric motor 252 is maintained, which otherwise would no longer be connected to the feeding network when the rod 250a of the switch 250 returns into the raised rest position, after the passage of the combs 203. When the cam 257 has completed a rotational turn, the push-button of the switch 258 rises interrupting the feed of the motor 252.

According to what has previously been described, the rotation through 360° of the spindle 255 causes the working of means adapted to arrange an article of hosiery on the teeth 203a of a comb 203 with the intervention of the lateral combs 267 adapted to raise the ends of the said article of hosiery. The comb 203 concerned is the one which is passed along the chute 247 and is inserted in the aperture 248 until falling, by inertia, into the guide grooving 205. During the last section of the rotation of the spindle 255 before its halt, the contact occurs between the projection of the cam 256 and the relative roller 259, causing the oscillation of the lever 260 and thus the displacement of the rod-like member 207 for engagement with the lever 266 rigid with the pin 265. Thus occurs the advance of the comb 203 carrying the article of knitwear to be linked, by the thrusting action exercised by said rod-like member 207. The comb 203 carrying the article of hosiery thus arrives at the initial section of the plate 268 which is briefly displaced in a lateral direction by the engagement with the edge of said article for linking. The displacement of the plate 268 activates the switch 270, which actuates the motor relative to the linking machine which also controls the rotation of the needle-holder rim 201. This latter motor remains working for all the time in which the push-button 270a of the switch 270 remains activated, that is for all the time in which the plate 268 remains laterally displaced by the engagement with the edge of the article to be linked.

The rotation of the needle-holder rim 201 causes the displacement of the chain 212 carrying the points 212a which, intersecting in the edge of the article for linking, cause the transferring of the latter towards said needle-holder rim 201, together with the comb 203 under consideration. When the knitted article has passed the plate 268, this latter returns to the rest position, allowing the raising of the push-button 270a of the switch 270 and thus causing the halting of the motor of the linking machine. The needle-holder rim 201 remains stationary while the knitted article under consideration stops, together with the respective comb 203 in the position shown on the right in FIG. 25, waiting for the transfer onto the needles of the rim 201.

All the feeding device remains stationary until the operator acts once again on the extended pusher 241 so as to cause the descent of another comb 203 along the chute 247. When this occurs the contact bar 250a of the switch 250 lowers once again and causes the restarting of the motor 252 and the commencement of a new operative cycle capable of loading a further comb 203 with a further article of hosiery meanwhile inserted along the slit 206 to the level of the loader member 204. When the latter article of hosiery displaces the plate 268, the motor of the seaming machine starts once more with the consequent displacement of the needle-holder rim 201 and the chain 212. The article of hosiery which had arrived near the needle-holder rim 201, beyond the plate 268, is then displaced by the chain 212 towards the needles of said rim onto which it becomes transferred by the action of the oscillating fork 271 which, with the saw-toothed edges 271a, operates the transfer step by step.

The article of hosiery is thus completely transferred onto the needles of the rim 201, while the empty comb 203 continues its course until reaching the belt 209. This latter carries the comb to the belt 210 which, in turn transfers the comb to the belt 211, which carries it to the loader member 204 at the housing delimited by the plates 237, 238, 239. The comb 203 remains in said housing until the operator acts once again on the extended pusher 241.

In this way the needle-holder rim 201 is displaced only during the transfer of the articles of hosiery on the respective needles, so that these latter are arranged at small distances one from the other on all the development of said rim 201, eliminating empty spaces, useless waste of threads and possible entaglement of the latter.

In other words the starting of the feeding device is co-ordinated to the movement of the needle-holder rim 201 in the sense that the latter is briefly displaced at each loading of a comb 203, that is at each actuation of the extended pusher 241. The operator assigned to the seaming machine consequently limits the latter to insert the article of hosiery into the slit 206 and to successively acuate said pusher 241, while the return of the combs to the loader member 204 is completely automatic.

The action of the chain 212 provided with points 212a is moreover such as to cause the displacement of the combs 203 and the relative articles of hosiery independently of the rim 201, so that the needles of the latter are not in any way subjected to bending during the transfer phase, which is very advantageous from the point of view of conservation of the needles, even when these are of very reduced dimensions. The action of transfer is also notably facilitated by the oscillating fork 271. It has been ascertained in practice that with six combs 203 a continuous working is possible in which all the periphery of the needle-holder rim 201 is used, in the case where the knitwears for linking are stockings and the linking machine is of average type. The feeding device according to the invention ensures a continuous and extremely regular working while the use of manual techniques is reduced to a minimum.

I claim:

1. In a linking machine having a needle-holder rim, a device for blind feeding of articles of hosiery to said needle-holder rim characterized in that it comprises a support framework for mounting on the fixed structure of said linking machine, a pair of spaced plate-like members arranged in said support framework, a slit defined by said pair of plate-like members and designed to receive said articles of hosiery, developing according to a direction essentially tangential to said needle-holder rim, a guide defined by the edge of one of said plate-like members and turned towards said slit, said guide being opened towards said slit, and developing parallelly to said slit and extending at least up to a zone of tangency with said needle-holder rim, a comb element supported by and slidable along said guide, and means adapted to engage said comb element with said articles of hosiery situated in said slit.

2. A device according to claim 1, characterized in that it comprises holding means arranged above said plate-like members and removably engaged with end portions of said articles of hosiery when positioned in said slit, and counter means co-operating with said holder means and arranged above said plate-like members.

3. A device according to claim 1, characterized in that it comprises transfer means for the transfer of said articles of hosiery from said comb element to the needles of said needle-holder rim.

4. In a linking machine having a needle holder rim, a device for blind feeding of articles of hosiery to said needle-holder rim characterized in that it comprises a support frame-work arranged for a mounting on the fixed structure of said linking machine, a pair of spaced coplanar plate-like members, arranged in said support framework, a slit defined by said pair of plate-like members and designed to receive said articles of hosiery, developing according to a direction essentially tangential to said needle-holder rim, holding means arranged above said plate-like members and removably engaged with end portions of said articles of hosiery when positioned in said slit, counter-means co-operating with said holding means and also arranged above said plate-like members, a guide, defined by the edge of one of said plate-like members and turned towards said slit, said guide being opened towards the said slit and developing parallelly to said slit and extending at least up to a zone of tangency with said needle-holder rim, a comb member supported by and slidable along said guide, pusher means acting on said comb member in a transverse direction to said slit for the engagement of said comb member with the articles of hosiery arranged in said slit, a first tension roller for said articles of hosiery, in engagement with one of said plate-like members in proximity of and parallel to said slit, a second tension roller for the articles of hosiery, in engagement with the other end of said plate-like members, in opposite position to said first roller, a positioning member approachable to said slit, for supporting one of said rollers, cam means for the cyclic actuation of said holding means, of said counter-means, of said pusher means acting on said comb member, of said tension rollers as well as of said positioning member, said cam means causing said first and second rollers to co-operate at the slit, a gear reduction unit for the rotation of said rollers and for the actuation of said cam means, and transfer means for the transfer of said articles of hosiery from said comb member to needles of said needle-holder rim.

5. A device according to claim 4, wherein said guide extending at least to an area of tangency with said needle-holder rim comprises a further guide member of length at least equal to that of said comb member, and pivoted on a support mounted on said framework, a counterbalance, carried towards one end by said further guide said further guide defining in the rest position thereof an extension of said guide beyond the said point of tangency.

6. A device according to claim 5, wherein said holding means comprise a sleeve support secured to the upper face of one of said plate-like member, a rod member in said support with longitudinal axis perpendicular to said slit, spring loaded lever means actuated by said cam means at the other end of said rod member, so as to cyclically provide this latter with an alternate movement along its own longitudinal axis and an oscillating movement about the axis itself; guide shoulders to form said counter means, which guide shoulders are secured on the other plate-like member and are orthogonal to said slit, a plate element arranged to slide between said guide shoulders, spring loaded lever means pivoted on said framework and adapted to engage said plate element along the edge of the latter opposite to said slit, said lever means being positioned for engagement with said cam means to be actuated thereby, so that said plate element is cyclically caused to effect a translational movement in direction transversal to said slit.

7. A device according to claim 4, wherein said pusher means of said comb member comprise at least one aperture produced in the body of said plate-like member provided with said guide for the comb member and having an opening facing cavity of the guide itself, a rod-like member slidingly inserted in said aperture, spring loaded lever means positioned for engagement with the end of said rod-like member opposite to said opening into said guide, cam means situated for engagement with said spring loaded lever means, so as to cyclically provide the rod-like member itself, with an alternate movement in direction transversal to said guide.

8. A device according to claim 4 comprising a carriage member forming said member supporting one of said tension rollers for the articles of hosiery, guides for slidingly supporting said carriage member and positioned below said corresponding plate-like member and comprises on the side opposite to said slit, a checking member in engagement with spring loaded lever means, cyclically providing through said cam means, a movement of approachment and distancing with respect to said slit.

9. A device according to claim 8, characterized in that said tension rollers comprise a rotating shaft supported by said plate-like members, a plurality of bushes rigidly mounted on said shaft and rotating with it, a plurality of sleeves mounted idly on said shaft and alternate with said bushes, an adjustable extensible member associated to an end of said shaft and thrusting on the transversal facing surfaces and in fractional contact with said bushes and said sleeves, these latter having a diameter greater than that of said bushes and have external knurled surface.

10. A device according to claim 9, wherein said further means for the transfer of articles of hosiery from said comb member to the needles of said needle-holder rim, are formed by double curvilinear bladed member supported by the framework carrying said linking machine at the said area of tangency, said curvilinear bladed member having an end substantially tangential to the base of the teeth of said comb member and the other end at least partially in superimposed position to the needles of said needle-holder rim.

11. A device according to claim 4, wherein it comprises at least one conveyor belt, arranged between the loading and discharge stations of the said comb member, for the automatic return of said comb member after the transfer of the article of hosiery onto said needle-holder rim, and a loader member positioned near said loading station laterally to said slit, said loader member comprising a chute associated to a manually actuated pusher member for the starting of transversal sliding of said comb member in the respective guide through a corresponding loading aperture, means being provided for automatically longitudinally pushing said comb member inside the said guide towards the station of transfer for the transfer of the articles of hosiery onto the said needle holder rim, said means being actuated by a switch associated to said loader member.

12. A device according to claim 11, wherein it comprises a chain provided with peripherally projecting spikes or the like, revolving mounted near said slit for the displacement along the latter of the articles of hosiery already mounted on the respective comb members towards the zone of transfer onto said needle-holder rim, transmission means being provided in order to derive the motion of said chain from that of said needle-holder rim.

13. A device according to claim 12, wherein it comprises a first conveyor belt revolvingly mounted in direction substantially orthogonal to said slit, positioned near said needle-holder rim and in side-by-side relationship with a second conveyor belt arranged substantially orthogonally to said first conveyor belt and followed by a third conveyor belt arranged in alignment with said second conveyor belt and comprising a section slightly inclined in the sense of rising towards said loading station and a substantially horizontal section arranged near said loading station, transmission means being provided for placing said conveyor belts in motion, preferably in coordination with said needle-holder rim.

14. A device according to claim 13, wherein it comprises a control switch for the motor of the linking machine associated to a respective control plate positioned near said slit in position such as to suffer a slight lateral displacement during the passage of the articles of hosiery mounted on said comb members, the said plates being preferably arranged near said chain provided with spikes and developing for a certain section along said slit.

15. A device according to claim 14, wherein on said chute of the loading member is mounted a projecting contact bar of a switch inserted in the same electric circuit as a motor for the actuation of means for mounting the articles of hosery on said comb members, which electric circuit also comprises a second switch actuated by a cam placed in rotation by said motor, in order to provide a 360° rotation of a control shaft carrying the cams for the actuation of said means for the mounting of the articles of hosiery onto the comb members.

16. A device according to claim 15 in which said means for automatically longitudinally pushing said comb members comprises a rod-like member mounted for to-and-fro sliding inside said said guide and co-operating with an oscillating lever in turn connected to a lever system terminating at a cam rigidly mounted on said control shaft, said oscillating lever being arranged, in rest conditions, in disengaged relationship with respect to said rod-like member, at the side of said slit.

17. A device according to claim 16, wherein is provided a transverse fork mounted for to-and-fro movement on a plate-like body and terminating with saw-toothed edges situated above and below the transit zone of the comb members near the needle-holder rim in order to exercise a transverse thrusting action on the edges of the articles for linking during their transfer onto said needle-holder rim, means being provided for actuating a rapid oscillating motion to said fork.

References Cited

UNITED STATES PATENTS

| | | | |
|---|---|---|---|
| 2,669,952 | 2/1954 | Getaz | 112—27 |
| 3,100,464 | 8/1963 | Wick et al. | 112—27 |
| 3,340,834 | 9/1967 | Rosso et al. | 112—25 |

MERVIN STEIN, Primary Examiner

G. V. LARKIN, Assistant Examiner